Jan. 18, 1938.　　　　C. C. TOWNE　　　　2,105,897
DRIVE FOR ROTATING ELEMENTS OF ELECTROOPTICAL SYSTEMS
Filed April 20, 1934　　　2 Sheets-Sheet 2
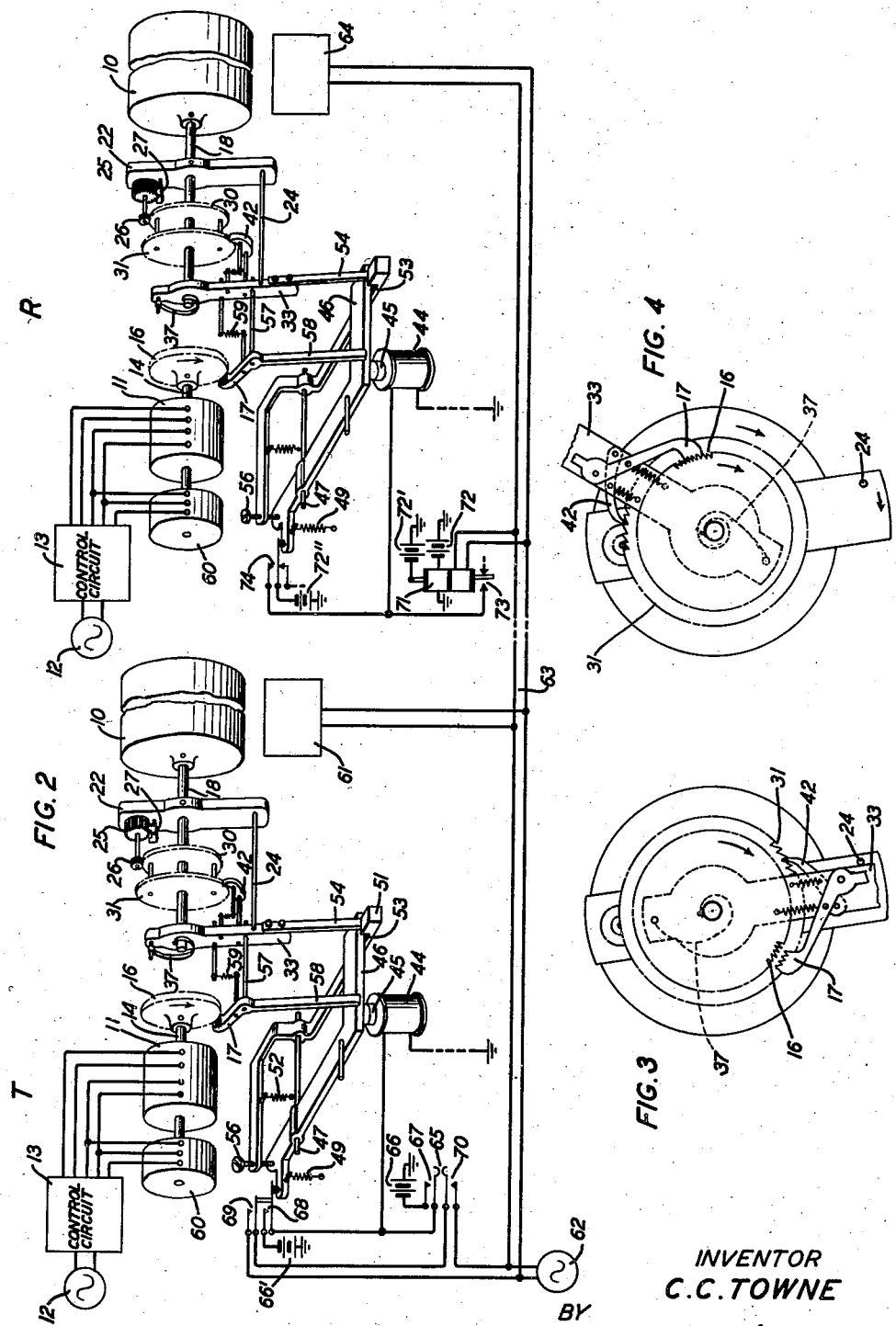
INVENTOR
C.C. TOWNE
BY
ATTORNEY Patented Jan. 18, 1938

2,105,897

UNITED STATES PATENT OFFICE 2,105,897

DRIVE FOR ROTATING ELEMENTS OF ELECTROOPTICAL SYSTEMS

Charles C. Towne, Summit, N. J., assignor to Bell Telephone Laboratories, Incorporated, New York, N. Y., a corporation of New York Application April 20, 1934, Serial No. 721,525

20 Claims. (Cl. 178—69.5)

This invention relates to apparatus for controlling the movement of movable elements and more particularly to apparatus for starting and driving in phase the rotatable elements of a picture transmission system.

An object of the invention, specifically stated, is to start a relatively large picture cylinder from rest and to bring it into a desired phase relationship with respect to its driving motor while maintaining the motor in synchronism with a source of constant frequency control current.

It is well known that in any practical electrooptical image reproducing system employing movable elements such as picture cylinders, for example, it is necessary to drive the movable elements of the transmitting and receiving apparatus accurately in synchronism and in phase. When picture cylinders are employed, it is necessary to stop the cylinder after the picture or pictures mounted on the transmitting cylinder have been transmitted and reproduced in order to mount other pictures on the transmitting cylinder and to mount an unexposed sheet of light sensitive film or paper on the receiving cylinder. It has been proposed heretofore to maintain the driving motors at different stations, respectively, of a picture reproducing system in synchronism under control of independent constant frequency sources of current, one for each motor. In such a system, when picture cylinders having a small moment of inertia and operating at a relatively low speed are employed, it is possible to start the cylinders from rest by simultaneously connecting them directly to their continuously running driving motors without throwing the motors out of synchronism with the source of control current. When employing relatively large picture cylinders to be driven at a relatively high speed by motors of reasonable size, it was found impractical to start the cylinders by connecting them directly to the motors because each motor would be thrown out of synchronism with its controlling constant frequency current source due to the moment of inertia of the cylinder being too high with respect to that of the driving means.

In accordance with a specific embodiment of the invention herein shown and described for the purpose of illustration, there is provided apparatus for simultaneously starting and driving in a predetermined phase relationship and at a relatively high speed the picture cylinders of an electrooptical picture reproducing system. The driving motors at the different stations, respectively, are maintained at a constant speed under control of independent sources of constant frequency alternating current. The picture cylinder at each station is started from rest at a desired predetermined phase position by connecting it through a spiral spring to its driving motor while the motor is running. The ratio of the moment of inertia of the driving means with respect to the moment of inertia of the picture cylinder, and the speed of the motor are such that the motor would be thrown out of synchronism with respect to its speed control current if the motor and the cylinder were to be directly connected in starting. While the spring is being wound up, the cylinder is started and brought up to speed. When the cylinder reaches the speed of the driving motor, the spring commences to unwind and the cylinder continues to increase in speed because of the energy stored in the spring. While the cylinder is traveling faster than the motor, the cylinder shaft drives an adjustable escapement mechanism which permits the cylinder to rotate only slightly faster than the motor. A stop carried by the cylinder shaft prevents the cylinder from rotating faster than the motor after the cylinder has advanced to its initial phase position, and the cylinder is maintained in this phase position due to the residual tension in the spring. When this stop becomes effective, there is not sufficient impact to throw the motor out of synchronism since the cylinder is traveling only slightly faster than the driving motor at that time. Means are provided for rendering the escapement mechanism ineffective except when the cylinder is rotating faster than the motor.

The invention is illustrated in the accompanying drawing in which:

Fig. 2 is a diagrammatic view of a picture transmission system embodying the invention; and Figs. 3 and 4 are diagrammatic views showing the phase displacement of parts of the coupling apparatus occurring during its operation.

Figure 1:
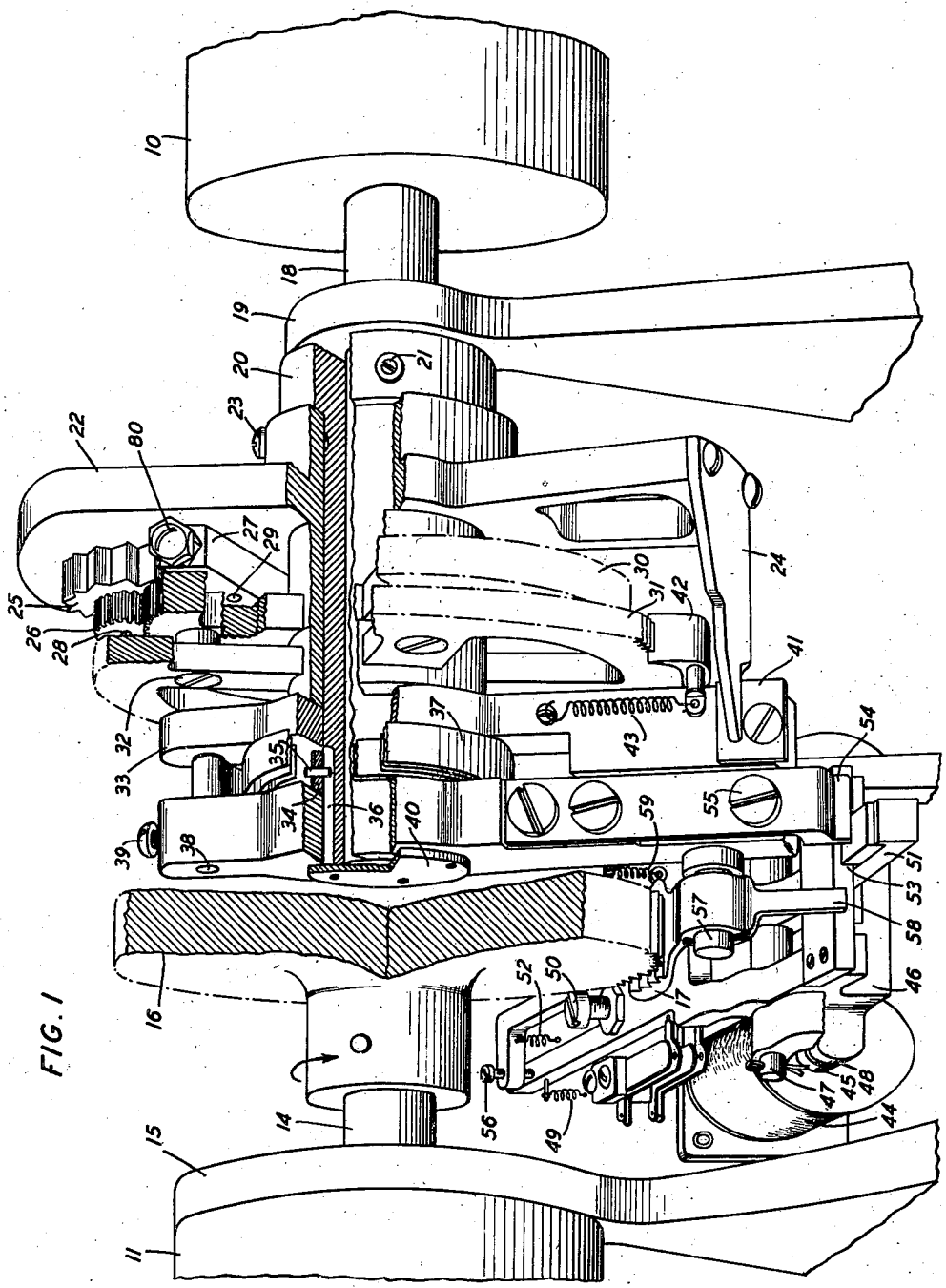
Fig. 1 is a perspective view, partly in section, of apparatus for coupling a picture cylinder to its driving motor in accordance with the invention.

The invention is particularly applicable to a picture reproducing system of the type disclosed in a copending application of A. D. Dowd, Serial No. 714,321, filed March 6, 1934. At the picture transmitting station T and at the picture reproducing station R there is provided a large metallic picture cylinder 10 which may be 12 inches in circumference and 18½ inches in length, for example, so that pictures 11 inches by 17 inches or smaller may be mounted on the transmitting cylinder and reproduced upon a sheet of light sensitive paper of this size mounted on the receiving cylinder. A small, direct current motor 11, about ½₀ horsepower, for example, is provided for driving each picture cylinder 10 and also a lead screw which moves the optical scanning equipment parallel to the axis of rotation of the cylinder, as disclosed in the Dowd application, Serial No. 714,321, supra. The motor 11 at each station is operated at a constant speed of 100 revolutions per minute, for example, under control of a constant frequency current source 12, the frequency of which may be 300 cycles per second, for example, the speed control circuit 13, and the pilot generator 60 on the motor shaft. The apparatus for maintaining the motors 11 at a constant speed is described more in detail in Patent 2,050,624 of E. R. Morton, granted Aug. 11, 1936. The motors 11 at the two stations, after being started, thus operate accurately in synchronism and in a fixed phase relationship.

To one end of the shaft 14 of the driving motor 11 projecting through the supporting member 15 is secured a claw gear 16. This claw gear is free to rotate with the driving motor independently of the picture cylinder when the claw 17 is held out of engagement with the claw gear.

One end of the shaft 18 which drives the picture cylinder 10 is supported by the bearing member 19. A sleeve 20 is secured to the shaft 18 by means of a set screw 21. The member 22 is secured to the sleeve 20 by means of the set screw 23. To one end of the member 22 is secured a stop 24. Near the opposite end of the member 22 are mounted an escapement wheel 25, a spur gear 26 and an escapement 27. The escapement wheel 25 and the spur gear 26 are secured to each other and are rotatable about the shaft 28 secured to the member 22. The escapement is mounted so that it may oscillate on the shaft 29 secured to the member 22. The gear 30, the teeth of which mesh with the teeth of the spur gear 26, and the ratchet gear 31 are secured to each other by the screws 32 and are mounted to rotate about the sleeve 20 as a bearing. The yoke member 33 is also mounted so as to be free to rotate about the sleeve 20 as a bearing. A collar 34 mounted on the sleeve 20 is prevented from rotating about the sleeve by means of the pin 35, the inner end of which is held in the slot 36 in the sleeve 20. The inner end of a spiral spring 37 is secured to the outer end of the pin 35. The outer end of the spiral spring 37 is supported by a pin 38 which is secured to the yoke member 33 by means of a set screw 39. A plate 40 secured to the sleeve 20 holds the yoke member 33 in position on the sleeve 20.

It is now apparent that when the teeth of the claw 17 are in engagement with the teeth of the claw gear 16, the motor 11 drives the picture cylinder 10 through the spring 37. In assembling the apparatus on the shaft 18, the spring 37 is given an initial tension by turning the member 22 about the sleeve 20 before securing the member 22 to the sleeve 20 by means of the set screw 23. This initial tensioning of the spring is sufficient to maintain the stop 24 in contact with the portion 41 of the yoke member 33 when the cylinder 10 is running in synchronism with the motor 11. The picture cylinder 10 may be properly aligned with respect to the yoke member 33 by rotating the sleeve 20 about the shaft 18 before securing the sleeve to the shaft by means of the set screw 21. A pawl 42 supported on a shaft secured to the yoke member 33 is held in engagement with the teeth of the ratchet gear 31 by means of the helical spring 43. While the cylinder 10 is being brought up to synchronous speed from rest, the motor 11 runs faster than the cylinder and the spring 37 is wound up. During this time the portion 41 of the yoke member 33 moves out of contact with the stop 24 and, due to the shape of the teeth of the ratchet gear 31, the pawl 42 rides over the teeth of the ratchet gear. However, except when the motor is running faster than the cylinder, the pawl 42 engages the teeth of the ratchet gear 31 so as to prevent the pawl from riding over the teeth of the ratchet gear, and thus the ratchet gear and the yoke member 33 rotate at the same speed.

An electromagnetically operated tripping device comprising an energizing winding 44, a pole-piece 45 and an armature 46 is provided for controlling the starting and stopping of the cylinder 10. The armature is mounted on a shaft 47 and carries an extension 48 of magnetic material cooperating with the pole-piece. When the winding 44 is deenergized, the helical spring 49 secured to the armature holds the armature extension 48 out of contact with the pole-piece. The movement of the armature in this direction is limited by the adjustable screw 50. When the winding 44 is energized, the armature extension is attracted by the pole-piece and the armature is moved about the shaft 47 against the tension of the spring 49. The shaft 47 also carries a latching lever 51 the forward end of which is normally held in contact with the armature 46 by the helical spring 52 secured to the other end of the latching lever. The latching lever 51 has an enlarged end portion so that when the forward end of the latching lever and the armature are in contact there is formed a slot 53 for holding the extension 54 carried by the yoke member 33 in starting position. The extension 54 may be adjusted by means of the screw 55 so that, in stopping the cylinder the claw 17 may be fully released before the extension 54 strikes the armature 46. When the armature extension 48 is attracted due to the energization of the winding 44 to cause the armature to move against the tension of spring 49, the latching lever is also caused to move against the tension of spring 52 by the adjustable screw 56 threaded in the latching lever 51 and in contact with the end portion of the armature 46. The claw 17 is mounted on a shaft 57 secured to the yoke member 33 and carries an arm 58. When the claw 17 is released due to the movement of the armature 46, the spring 59 holds the teeth of the claw in engagement with the teeth of the claw gear 16. However, when the cylinder 10 is stopped due to the deenergization of the winding 44, the claw arm 58 engages the armature 46 to cause the claw to move about the shaft 57 against the tension of spring 59, thus throwing the claw out of engagement with the claw gear. When the claw is thus disengaged, the claw wheel continues to rotate with the motor. Due to the momentum of the picture cylinder 10, the extension 54 of the yoke member 33 continues to move for a short distance after the claw is disengaged. At this time the latching lever 51 is depressed against the tensioning of the spring 52 by the extension 54 to permit the extension 54 to contact the armature 46. The forward end of the latching lever 51 is then restored to its former position due to the pull of the spring 52 so that the extension 54 is held in the slot 53.

The picture mounted on the cylinder 10 at the transmitting station is scanned by the optical apparatus 61 comprising a light source and a photoelectric cell to produce a modulated carrier current having variations corresponding to the tone values of successively scanned elemental areas of the picture. The carrier component of this current may be produced, for example, by interrupting at a desired frequency a light beam which illuminates the elemental areas of the picture in succession. For purposes of illustration, however, there is shown a source of carrier current 62. The modulated carrier current is transmitted over the transmission channel 63 to the receiving station R where it is utilized to control the optical apparatus 64. The optical apparatus 64 comprises a light source which illuminates the elemental areas in succession of a light sensitive surface mounted on the picture cylinder 10 at the receiving station to control the exposure of the light sensitive surface. The optical apparatus 61 and 64 is moved in the direction of the axis of rotation of the picture cylinder 10 at such a rate, for example, that the cylinder rotates through 100 revolutions while the optical apparatus moves through a distance of 1 inch, thus causing the scanning of 100 lines per inch. The apparatus for scanning and reproducing the picture is described more in detail in the copending application of A. D. Dowd, Serial No. 714,321, supra.

The picture cylinders 10 at the two stations are simultaneously started from the position of rest in which they are held by the armatures 46 the latching levers 51 and the springs 37, by simultaneously energizing the windings 44 of the trip magnets at the two stations. The starting circuit specially designed for this apparatus is fully disclosed in a Patent 2,059,564 of A. D. Dowd, granted Nov. 3, 1936, and is only partly illustrated in Fig. 2. As shown in that figure, the key 65 at the transmitting station is momentarily closed to cause the simultaneous energization of the windings 44 at the two stations. The closing of key 65 causes the energization of the winding 44 at the transmitting station by current from grounded battery 66, through contact 67. The resulting operation of the armature 46 causes the closing of contacts 68 and 69. The closing of contact 68 completes an energizing circuit for winding 44 from grounded battery 66', thus maintaining the energization of the winding 44 after the key 65 has been released. Due to the closing of contacts 69 and 70 the transmission of unmodulated carrier current from source 62 is interrupted, but only for a brief interval since the subsequent release of the key 65 breaks the interrupting circuit at contact 70. The momentary interruption of the carrier current from source 62 causes the relay 71 at the receiving station R to operate due to the biasing current from battery 72. The operation of relay 71 causes the energization of winding 44 at the receiving station by current from battery 72' through the contacts 73, thus causing the armature 46 to operate. The operation of the armature 46 closes the contact 74 for maintaining the energization of the winding 44 by current from battery 72" after the armature of relay 71 is restored to its inoperative position due to the transmission of the carrier current from source 62. When the transmission of a picture has been completed, the energizing circuit for the winding 44 at each station is automatically opened by a contact located on the base of the machine which supports the cylinder 10 and the optical apparatus 61 or 64.

To reproduce pictures faithfully, the cylinders 10 at the two stations must be maintained not only in synchronism but accurately in phase, say within ±0.5 mechanical degree. To control the phase with such accuracy the frequency of the source of 300 cycle control current 12 must be maintained extremely constant, say within one part in 100,000, and the inductor type generator 60 must be provided with a large number of teeth, 180, for example. As explained in the patent of E. R. Morton, supra, the speed of the motor 11 is controlled by varying its armature current in accordance with the phase relationship between the electromotive force of the constant frequency source 12 and the electromotive force of the pilot generator 60. The frequency of the electromotive force generated by the pilot generator is normally 300 cycles per second. As is common with synchronous machines, a maximum phase displacement of 180° between the electromotive force of the constant frequency source and the electromotive force of the pilot generator is theoretically possible before synchronism is lost. However, such a phase displacement is equivalent to only 1 mechanical degree of the rotating system. It is obvious, therefore, that if the cylinder were to be started from rest by coupling it directly to the motor while it is running at synchronous speed, it would be necessary for the cylinder to be brought up to speed during the short interval required for the motor to rotate through an angle of 1 mechanical degree, or approximately .0016 second. To bring the cylinder having a large moment of inertia up to speed in such a short time would obviously require an exceedingly large torque. The use of driving motor or a motor and damped flywheel capable of producing such a large torque would be entirely impractical because of its size and the cost of the apparatus. The cushioning apparatus mounted on the shaft 18 is therefore provided so that the cylinder may be brought up to speed gradually, say during the time interval that the motor rotates through 1½ or 2 revolutions.

When the key 65 is closed momentarily to cause the energization of the windings 44 of the trip magnets at the two stations, the armature 46 at each station is operated to release the arm 58 of the claw 17 and the extension 54 of the yoke member 33. The claw 17 thus engages the claw gear 16 which then drives the yoke 33 to wind up the spring 37. When the spring has been partly wound, the energy stored in the spring starts the shaft 18 in rotation. When the cylinder at each station has been started, the motor and the yoke member run faster than the picture cylinder for a time while the cylinder is being brought up to speed, thus further winding up the spring 37. While the spring is being wound up, the end portion 41 of the yoke member 33 moves away from the stop 24, as shown in Figs. 3 and 4. At the time the cylinder 10 reaches the speed of the motor, the yoke member 33 leads the stop 24 by a large angle, say 270° or somewhat less. The phase angle of lead may vary somewhat due to variations in friction, etc., the variations being relatively small for a given machine, but relatively larger as between different machines.

Due to the energy stored in the spring 37, the cylinder 10 continues to accelerate after it has been brought up to the motor speed, the spring 37 unwinding and bringing the picture drum back to its initial or starting phase position. In other words, the lead of the yoke member 33 with respect to the stop 24 is reduced to zero and the end portion 41 of the yoke member 33 is brought against the stop 24. If no means were provided for limiting the speed of the cylinder when it is running faster than the motor, the impact of the stop 24 striking against the end portion 41 of the yoke member 33 would throw the motor out of synchronism. There is provided, therefore, an escapement 27 which is caused to oscillate about its shaft when the cylinder is running faster than the motor, thus retarding the rotation of the picture cylinder and causing the stop 24 to come against the end portion 41 of the yoke 33 without sufficient impact to throw the motor out of synchronism. The moment of inertia of the escapement 27 can be varied by adjusting the screws 80, one at each end of the escapement, thereby determining the rate at which the stop 24 approaches the end portion 41 of the yoke 33. The escapement is effective to slow down the rotation of the picture cylinder only when the cylinder is rotating faster than the motor, that is, when the member 22 and the gear 30 are changing in phase with respect to each other. When the motor is running faster than the picture cylinder, the pawl 42 slides over the teeth of the ratchet gear 31 so as to permit the yoke member 33 to rotate faster than the member 22 without causing the gear 30 to rotate faster than the member 22. During this time, and also when the motor and picture cylinder are running at the same speed, the gear 30 is driven by the member 22 through the escapement wheel 25 and the spur gear 26 due to friction and the inertia of the escapement. However, when the cylinder is running faster than the motor and therefore the member 22 is running faster than the yoke member 33, it is obvious that the member 22 can not drive the gear 30 faster than the yoke member 33 because the pawl 42 prevents the ratchet gear 31, and therefore the gear 30, from running faster than the yoke member. At this time, therefore, the spur gear 26 moves about the gear 30 to cause the operation of the escapement, thereby retarding the rotation of the member 22 and the picture cylinder 10.

There is thus provided a practical arrangement for starting movable elements having a relatively high moment of inertia from rest in a predetermined initial phase position and for subsequently driving the movable elements accurately in synchronism and in their initial phase position. While at present it appears that the invention is particularly applicable to electro-optical image producing systems in which the movable elements must be started from rest and maintained in synchronism and in phase with a high degree of accuracy, obviously the need for meeting such requirements may exist or arise in the future in other more or less unrelated fields to which the invention would also be applicable.

What is claimed is:

1. Means for coupling a driven shaft to a driving shaft comprising means for causing the phase relationship between said shafts to change rapidly in one direction, and means automatically set into operation whenever the phase relationship is changing in the other direction for causing the phase relationship to change only relatively slowly in said other direction.

2. Means for coupling a driven means to a driving means comprising means for causing the driving means to move considerably faster than said driven means, and means automatically set into operation whenever the driven means is moving faster than the driving means for causing said driven means to move only relatively slightly faster than said driving means.

3. Coupling means for movable elements comprising yieldable means through which one of said elements is driven by the other of said movable elements, thereby permitting the storage of energy in said yieldable means, and means controlled by the release of energy stored in said yieldable means for retarding the release of said energy.

4. Coupling means for movable elements comprising a spring through which one of said elements in driven by the other of said elements, thereby permitting the storage of energy in said spring, means effective only when the energy stored in said spring is being released for retarding the release of said energy, and means for preventing the release of energy stored in said spring beyond a predetermined minimum to maintain said elements in a predetermined phase position while moving.

5. Means for coupling a rotatable element to its driving motor comprising means for storing energy when said rotatable element is being brought up to the speed of said motor, and for releasing said energy when the speed of said rotatable element has increased beyond the speed of said motor, and means effective only when the rotatable element is moving faster than the driving motor for retarding the movement of said rotatable element.

6. Means for coupling a rotatable element to its driving motor comprising means for storing energy when said rotatable element is being brought up to the speed of said motor, and for releasing said energy when the speed of said rotatable element has increased beyond the speed of said motor, means effective only when the rotatable element is moving faster than the driving motor for retarding the movement of said rotatable element, and means effective when said motor and said rotatable element are rotating in a predetermined phase relationship for preventing said rotatable element from rotating faster than said motor.

7. Means for coupling a rotatable means to a continuously rotating driving means comprising a spiral spring, one end of which is secured to said rotatable means, means under control of an operator for connecting said driving means to the other end of said spring at a desired instant, thereby determining the initial phase relationship between said driving means and said rotatable means, means for retarding the rotation of said rotatable means, and means for rendering said retarding means effective only when the speed of said rotatable means is greater than the speed of said driving means.

8. A combination in accordance with claim 7 in which the retarding means comprises an escapement mechanism associated with said rotatable means.

9. A combination in accordance with claim 7 in which the means for rendering said retarding means effective comprises a ratchet wheel and a pawl.

10. Means for starting a rotatable means and driving it in a predetermined phase position by a motor comprising a claw gear secured to the motor shaft, a spiral spring the inner end of which is secured to said driven shaft, spring supporting means to which the outer end of said spring is secured, said means being free to rotate about said driven shaft within limits one of which is determined by the tensioning of said spring, a stop secured to said driven shaft and adapted to engage an extended portion of said spring supporting means for determining the other limit of rotation of said spring supporting means about said driven shaft, a claw secured to said spring supporting means adapted to be released under control of an operator to engage said claw gear, a ratchet wheel and gear secured to each other and mounted to rotate about said driven shaft, a pawl secured to said spring supporting member so that said pawl rides over the teeth of said ratchet wheel when said spring supporting means is rotating faster than said driven shaft and engages the teeth of said ratchet wheel when the speed of the spring supporting means is equal to or less than the speed of said driven shaft to prevent said ratchet wheel and gear from rotating faster than said spring supporting means, a spur gear engaging said gear, an escapement wheel secured to said spur gear, an escapement cooperating with said escapement wheel, a shaft for said spur gear and escapement wheel, and means for supporting said shaft secured to said driven shaft.

11. A combination in accordance with claim 10 in which there is provided an adjustable member carried by said spring supporting means, electromagnetic means for engaging said adjustable member and substantially simultaneously throwing said claw out of engagement with said claw gear when said electromagnetic means is in unoperated condition, and means for causing the operation of said electromagnetic means for releasing said adjustable member and substantially simultaneously releasing said claw to cause it to engage said claw gear.

12. Electromagnetic means comprising an energizing winding, an armature, a pivotal support for said armature, a lever having a pivotal support, said lever being free to move independently of said armature, yieldable means for normally holding said lever in engagement with said armature, said lever having an enlarged end portion extending beyond said armature to form a slot when said armature and lever are in engagement.

13. Means for starting a rotatable means to be driven by an electric motor comprising electromagnetic means having an energizing winding and an armature, a pivotal support for said armature, a lever having a pivotal support, said lever being free to move independently of said armature, yieldable means for normally holding said lever in engagement with said armature, said lever having an enlarged end portion extending beyond said armature to form a slot when said lever and armature are in engagement, means for connecting said rotatable means to said driving means, said last mentioned means being held in inoperative position by said armature when said electromagnetic means is in the unoperated position, a member carried by said rotatable means adapted to be held in said slot when said electromagnetic means is in unoperated position, and means for operating said electromagnetic means for releasing said connecting means and said member connected to said rotatable means.

14. Apparatus for starting and subsequently driving in synchronism and in a predetermined fixed phase relationship, a plurality of rotatable means, such as picture cylinders, by electric motors which are energized under control of constant frequency current to maintain them at synchronous speed, comprising means for connecting each of said rotatable means to its driving motor while the motor is running, electromagnetic means for rendering said connecting means inoperative and for holding said rotatable means in said predetermined fixed phase relationship when at rest, means for energizing said electromagnetic means for releasing said rotatable means and for rendering said connecting means operative, and means for preventing said motor from being thrown out of synchronism due to the inertia of said rotatable means.

15. Means for starting a rotatable means, and driving it by a driving means comprising means secured to said driven means adapted to connect said driven means to said driving means, means movable about a shaft for throwing said connecting means out of engagement with said driving means, a second means movable about a shaft independently of said first movable means, said two movable means cooperating to form a slot for holding said driven means in a fixed position when said connecting means is disengaged, and means for simultaneously operating said two movable means for simultaneously releasing said driven means and said connecting means.

16. Means for starting and stopping a rotatable driven means in a predetermined phase position comprising means carried by said driven means adapted to connect said driven means to its driving means, an extension carried by said driven means, and means for engaging said connecting means to disconnect it from said driving means and for subsequently engaging said extension to stop the rotation of said driven means.

17. Means for connecting a driven shaft to its driving means comprising a member secured to said shaft and rotating therewith, an escapement and an escapement wheel mounted on said member, a spur gear secured to said escapement wheel, a stop secured to said member, a gear and a ratchet gear secured together and mounted on said shaft so as to be free to rotate about said shaft, the teeth of said gear being in mesh with the teeth of said spur gear, a spiral spring, the inner end of which is secured to said shaft, spring supporting means mounted on said shaft so as to be free to rotate about said shaft, the outer end of said spring being secured to said spring supporting means, a claw gear driven by said driving means, a claw secured to said spring supporting means adapted to engage said claw gear to cause said spring supporting means to be driven in such a direction as to wind up said spring, and a pawl secured to said spring supporting means and cooperating with said ratchet gear to engage the teeth thereof when the speed of said shaft is greater than the speed of said spring supporting means.

18. Apparatus for starting and subsequently driving in synchronism and in a predetermined fixed phase relationship a plurality of rotatable means, such as picture cylinders, by electric motors, comprising speed control means for each motor comprising a pilot generator driven by said motor and a constant frequency current source for controlling the motor speed in accordance with the phase relationship of the electromotive forces of said constant frequency source and said pilot generator, and means for coupling each rotatable means to its driving motor while the motor is running to bring the rotatable means up to the motor speed from rest over a period of time considerably greater than the period of said constant frequency source, thereby preventing a phase displacement of more than 180 electrical degrees between the electromotive forces of said constant frequency source and said pilot generator.

19. Apparatus for starting and subsequently driving in synchronism and in a predetermined fixed phase relationship a plurality of rotatable means, such as picture cylinders, by electric motors, comprising speed control means for each motor, means at each station comprising a pilot generator driven by said motor and a constant frequency current source for controlling the motor speed in accordance with the phase relationship of the electromotive forces of said constant frequency source and said pilot generator, means for coupling each rotatable means to its driving motor while the motor is running to gradually bring the rotatable means up to and above the motor speed from rest, stopping means effective when said rotatable means reaches its initial phase position with respect to said motor for holding said rotatable means in said initial phase position, and means effective only when the rotatable means is rotating faster than the motor to retard the rotation of the rotatable means, thereby preventing a phase displacement of more than 180 electrical degrees between the electromotive forces of said constant frequency source and said pilot generator when said stopping means becomes effective.

20. Apparatus for coupling a rotatable means to a driving motor which is maintained at a constant speed under control of a source of constant frequency alternating current, comprising means for associating said rotatable means with said motor at a desired time while said motor is running, the rotatable means being at that time in a certain initial phase position with respect to said motor, to start said rotatable means from rest, means for preventing said motor from being thrown out of synchronism with said alternating current due to the inertia of said rotatable means, and means for maintaining said rotatable means in said initial phase position with respect to said motor after said rotatable means has been brought up to the speed of said motor.

CHARLES C. TOWNE.